United States Patent [19]

Fort et al.

[11] 3,986,008

[45] *Oct. 12, 1976

[54] DATA COMPOSITING AND ARRAY CONTROL SYSTEM

[75] Inventors: J. Robert Fort; James A. Westphal, both of Altadena; Donald R. Juilfs, Chatsworth, all of Calif.

[73] Assignee: Geophysical Systems Corporation, Pasadena, Calif.

[ * ] Notice: The portion of the term of this patent subsequent to May 13, 1992, has been disclaimed.

[22] Filed: Apr. 7, 1975

[21] Appl. No.: 566,045

Related U.S. Application Data

[63] Continuation of Ser. No. 358,078, May 7, 1973, Pat. No. 3,883,725.

[52] U.S. Cl. ...................... 235/151.3; 340/15.5 DP; 340/15.5 CP

[51] Int. Cl.² ........................................... G01V 1/28

[58] Field of Search ................. 235/151.3, 181, 152, 235/156; 340/15.5 DP, 15.5 TS, 15.5 CP, 172.5; 346/33 C

[56] References Cited

UNITED STATES PATENTS 3,883,725 5/1975 Fort et al. ........................ 235/151.3

*Primary Examiner*—Joseph F. Ruggiero

[57] ABSTRACT

This abstract describes a system for acquisition of analog signals at one or more sensors, carrying these signals in groups of M channels to each of N spaced-apart array terminals, processing each signal in the array terminals by separately amplifying, adding to a shifting signal of selected amplitude, axis-crossing-coding these sum signals and storing as single bit pulses, one for each channel, in a parallel to serial converter. Each of the converters in each of the array terminals are operatively connected in series and to an array controller, which also controls a disc magnetic recorder to run at constant speed. The disc generates a disc clock, and responsive to the disc clock the converters are read out in series as a sequential train of MN bits and stored on the disc. Successive samples at subsequent digitizing intervals are stored on the disc, to form a first record.

Subsequent records can be processed, coded and recorded, and composited with previous records on the disc.

16 Claims, 4 Drawing Figures

DATA COMPOSITING AND ARRAY CONTROL SYSTEM

This is a continuation of application Ser. No. 358,078, now U.S. Pat. No. 3,883,725, filed May 7, 1973.

CROSS REFERENCE TO RELATED APPLICATIONS

This application is related to three other applications assigned to the same assignee as this application and filed on the same date as this application May 7, 1973. The titles of the other three applications are as follows: DATA ARRAY NETWORK SYSTEM Ser. No. 358,097; DATA ACQUISTION, TRANSPORT AND STORAGE SYSTEM Ser. No. 358,077; and DATA ACQUISITION AND PROCESSING SYSTEM Ser. No. 358,076.

DEFINITIONS

In this application a shifting function is defined as any time function, which when added to an analog signal causes a shift of the axis crossing times of the sum signal of the analog signal and the shifting function. Examples of shifting functions are noise, sinusoids, sawtooth time functions and so on. In this application the shifting functions may be random in at least one parameter, such as frequency, or phase, for example, and may be the sum of a plurality of shifting functions. In general, the shifting functions will be amplitude controlled in relation to the analog signals to which they are added.

For the purposes of this application the terms: recording unit, recording truck, recording boat, recorder, will mean the location of the array controller and the magnetic digital recording means.

The magnetic recording means will be a controlled magnetic recording disc or drum, or other clock controlled magnetic recording means.

The terms detectors, geophones, sensors, transducers will mean the devices which provide the analog signals which are entered into the acquisition system of this invention.

In the acquisition system of this invention there may be one or more recording channels each with one or more detectors connected hereto.

While this invention is most applicable to a multichannel acquisition system, and while it is contemplated that digital signals from each channel will be transmitted in sequence to the recording unit over a single conductor pair, it is contemplated that this single signal transmission can be any selected telemetering channel, including an electromagnetic radiation channel such as radio, or laser, or elastic wave channels such as in solids, liquids, or gases.

BACKGROUND OF THE INVENTION

This invention is in the field of data acquisition and processing systems. More particularly, it is concerned with apparatus and methods for detecting analog signals at spaced locations, coding these signals and transmitting them as trains of single bit digital pulses over a single pair of conductors to a distant recording unit, and compositing pluralities of said signals.

Still more particularly it concerns a system in which a plurality of separate detectors produce analog signals which are amplified, added to shifting functions of selected amplitudes and axis-crossing-coded and transmitted by a two conductor cable to a disc recording means, and there composited with succeeding repetitions of the signals.

While this invention is useful in the acquisition of any type of analog signals such as in the field of data collection, vibration analysis, sonar signaling, nuclear technology, and so on, it is also very appropriately useful in the area of seismic prospecting and as a matter of convenience will be discussed in that application.

In the prior art systems the seismic signals detected by the geophones have normally been transmitted by separate pairs of conductors to the recording unit. Here they are amplified in high gain, gain ranging amplifiers, multiplexed into sequential amplitude samples of successive traces, and digitized to fifteen or more bits, after which they are temporarily recorded on a magnetic tape loop. The next repetition of the elastic wave signal is processed in a similar way and successive amplitude measurements of a given trace at a given time are summed and the sum is again recorded on the magnetic tape loop.

SUMMARY OF THE INVENTION

It is a primary objective of this invention to provide a data acquisition, transmission and compositing system in which a great plurality of separate geophone channels are coded and multiplexed and transmitted to a time controlled recording means, and, under control of the recording means stored in preselected spaced locations, so that on a time controlled basis, a second record can be transmitted to the recording means, added to the record previously received, and the sum record rerecorded in the same storage locations.

This and other objects are realized and the limitations of the prior art are overcome in the present invention which differs in a number of ways from the prior art systems. In particular, the plurality of seismic signals that are detected in the field are divided into groups and processed in one or more array terminals, by being amplified and added to an amplitude controlled shifting function. In each of the array terminals there are a different plurality of geophone signals which are processed in a similar manner. The processed signals from the array terminals are impressed on a cable which serially passes through each of the array terminals to an array controller in the recording unit or truck. The array controller combines a number of operations. First it has two magnetic storage discs, of which one is always driven in synchronism with a clock. The controlled disc generates control pulses in synchronism with its rotation. Commands responsive to the control pulses call for periodic coding of the signal plus shifting function and serial transmision of the coded pulses to the disc, where they are stored in spaced address locations.

Inasmuch as the time intervals at which the coding is done must coincide with the times at which specific addresses pass beneath the write heads on each track, it is important that the disc become the controlling time source, or clock, of the recording system. The disc is driven by a programmable oscillator which drives a power amplifier which drives the motor which drives the disc precisely at the rate of one revolution in 32 ms.

The array controller using this control pulse from the disc, sets up a timing procedure by which it initiates commands which are sent to the array terminals to provide signal processing activities. After the geophone signal has been added to the shifting function, the sum signal is sent to an axis-crossing-coder (AXC). There are a plurality of these, one for each of the M geophone channels in each of the N array terminals. These AXC can be commanded simultaneously to axis-crossing-code the sum signals, which are continuously being delivered to them. This produces a simultaneous plurality of short duration pulses which are either +1 or 0, depending on whether they occur on one side or the other of the axis crossing of each channel. These coded pulses are passed in parallel to a parallel-to-serial converter where they are stored. This coding process is repeated at selected first intervals of time, for example, just prior to the digitizing intervals.

At fixed second selected time intervals, corresponding to the times of digitization, which may be one, two or four milliseconds, etc. apart, for example, the parallel-to-serial converter is commanded to read out the stored bits in serial order. These are read out and transmitted to the array controller. Simultaneously each of the other array terminals read out the signals stored in their converters and send them to the next in series terminal, and so on. Thus a first sample from each trace of the entire plurality of NM traces is provided as a flow of one bit signals to the disc storage. These bits are stored on the disc in appropriate addresses which are arranged in a first spaced relation. Because of the controlled speed of the disc, the speed of read out of the data is selected so that the train of bits will be stored in the proper addresses.

This first sequence of bits represents all of the information on all traces at the first digitizing interval. This procedure is repeated at each digitizing interval on command from the controller, until the complete signal traces for the entire group of geophones has been recorded on the disc as a first record.

Next, a repetition of the elastic wave signal is impressed on the earth, and another complete set of geophone signals are detected, modified, coded, multiplexed and recorded on the disc. There is space on the disc for two complete records, or sets of traces at any one time. When the fifth (for example) record is being recorded it is recorded on the disc in the same positions as the fourth record, the fourth record having been read out, simultaneously added to the sum of the first three records and placed back on the disc as the sum or composite of four records. This composite, or partial sum, is recorded in a second group of addresses in second spaced relation.

When the full number of source or elastic wave signals to be run is completed, and all the traces are composited, the first disc is filled. The control connections are switched to a second identical disc and it is brought to synchronous control. Thereafter, a second set of source repetitions are carried out and the geophone signals are brought in and recorded on the second disc, repeating the operations just described on the first disc.

While the second disc is being filled, with repeated recordings of successive repetitions of the sweep signal in the earth, the first disc is being unloaded to computer memory. The data are recorded on the disc in multiplexed form, in serial trace bits at each digitizing interval. When they are read off the disc, they are converted (demultiplexed) to consecutive digitizing intervals for each trace, or channel, then for the next trace or channel, and so on. In the computer memory, the data will be in trace form, ready for computer processing.

Although the signals as transmitted from the array terminal to the disc are one bit signals, by repetition of sweeps and compositing the words representing digitized measurements on each trace will accumulate up to eight bits, depending on the number of repetitions. There is provision for storage on the disc of eight bit words, and similarly in the computer memory. The computer memory is now organized on a trace storage basis so that complete traces can be read out in sequence and sent to the Fast Fourier Transform box for processing by convolution, or other processes.

The present invention is concerned with the disc system and array controller. These operate as a data compositor and array controller. On very simple infrequent commands from the computer, the array controller will provide appropriate detail commands, to the elastic wave source, such as the vibrator trucks, the array terminals, to control the signal processing, coding, and sequential read out to the disc, and the processing of the data on the disc in order to do the compositing, and eventually the read out of the composited data in trace form to the computer memory.

BRIEF DESCRIPTION OF THE DRAWINGS

These and other objects of this invention and a better understanding of the principles and details of the invention will be evident from the following description taken in conjunction with the appended drawings, in which.

DESCRIPTION OF THE PREFERRED EMBODIMENTS

Figure 1:
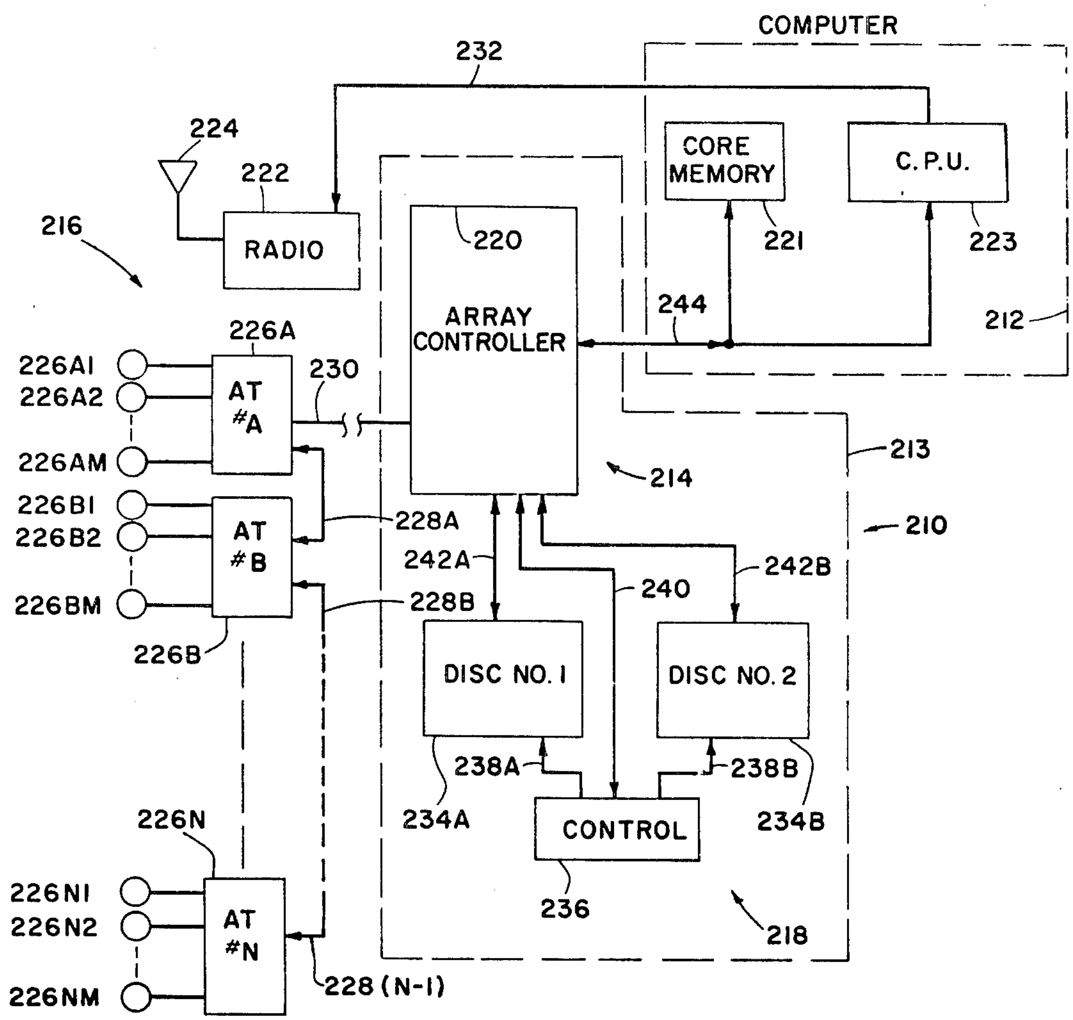
FIG. 1 is a schematic diagram of the array terminals, array cable network, the array controller, and disc storage system and computer.

Reference will now be made to the drawings, and in particular to FIG. 1. This shows in schematic form the entire system of the array controller and associated apparatus, identified by the numeral 210. This is enclosed in the dashed line 213. The heart of the system is the array controller which controls two magnetic discs, one of which is driven at constant speed and sets the timing of the entire recording and processing system.

The array terminal network indicated generally by the numeral 216 is fully described in a companion copending application entitled: DATA ARRAY NETWORK SYSTEM Ser. No. 358,097. Reference is made to this application.

The geophones are arranged in groups of M geophones, there being N groups of geophones connected to a corresponding N array terminals. The geophones identified by numeral 226A1, 226A2 . . . 226AM are connected in parallel to array terminal A, identified by numeral 226A. Similarly, geophones 226B1 to 226BM are connected in parallel to array terminal B, 226B, and so on, until geophones 226N1 to 226NM are connected in parrallel to array terminal N, 226N. The array terminals are connected together by multiple conductor cables 228A, 228B . . . 228(N-1).

The serially connected array terminals are connected by cable 230 to the recording truck and to the array controller 220. In the cable 230 are a signal conductor pair and a plurality of control conductor pairs, which are controlled by commands from the array controller.

Part of the array controller are two magnetic discs shown schematically as disc No. 1, 234A and disc No. 2, 234B. These are driven throgh a motor control 236 which provides precise frequency signals over leads 238A or 238B. The control signals to the motor control 236 come from the array controller 220 by leads 240 which pass coded signals from the controller (see FIG. 2) to a programmable oscillator 254 in the motor control 236. This will be described more fully in connection with FIG. 2.

Figure 2:
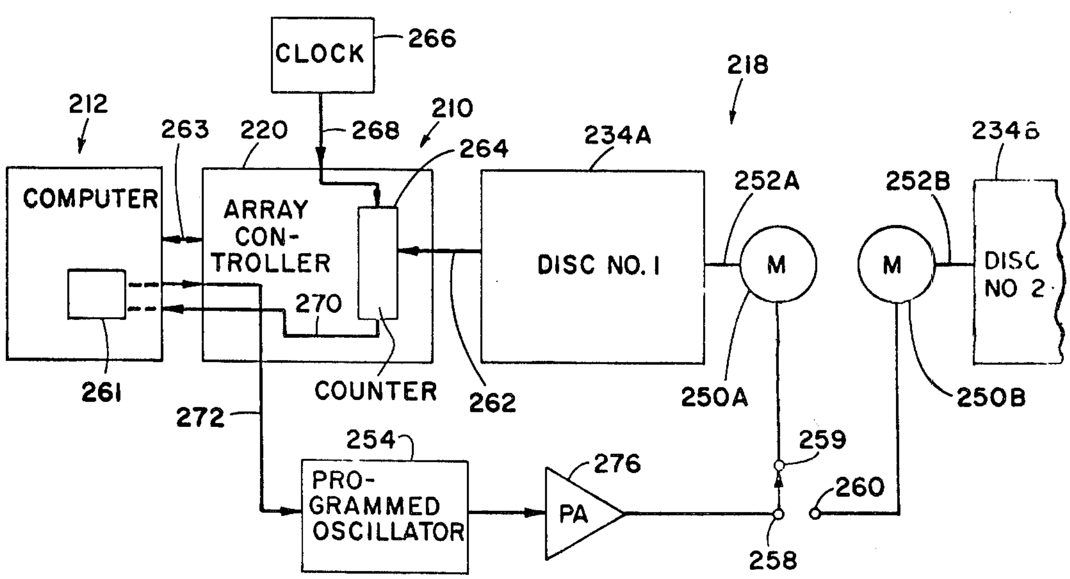
FIG. 2 is a circuit diagram of the speed control system for the disc.

Referring to FIG. 2, there is shown the array controller 220, computer 212, disc No. 1, 234A and disc No. 2, 234B. The motor 250A, through means 252A drives disc No. 1. On the disc No. 1 is a magnetic head (not shown) which puts out a control pulse precisely once each complete revolution of the disc. Normally, these pulses should be at precisely 32 millisecond intervals. These pulses are transmitted by lead 262 to the array controller where they control a counter 264. The counter receives uniform clock pulses from the clock oscillator 266 by lead 268. Each revolution of the disc the count in counter 264 is transmitted by lead 270 to the control unit 261 in the controller 220 where it is compared with the proper counter reading for the time interval of 32 milliseconds. A coded control signal is generated which goes by line 272 to a programmable oscillator 254, which adjusts its output frequency in accordance with the coded signal. This output of adjusted frequency goes to power amplifier 276 and through switch 258 goes to the motor 250A. At any one time the switch 258 is connected to the disc which is currently receiving the data, and which is generating the time signal to the controller. Both discs are supplied with power from the amplifier 276, although only one is controlled. One disc, namely the one in which data is at that moment being recorded, which will be called disc No. 1, is the one that is precisely controlled. The other disc at the same time may be running slightly out of synchronism with the first disc, but the amount of difference is so small that it is not serious during the process of unloading the disc into the computer memory, which is done coincidentally with the loading up the disc No. 1 by incoming geophone signals.

Referring back to FIG. 1, the procedure of operation is substantially as follows: On signal from the computer via bus 244 the array controller sets up a procedure which is in accordance with the computer instruction, of address locations, and number of sweeps and similar information. The computer sends out a signal by lead 232 to the radio 222 and antenna 224, which sends a start signal to the plurality of vibrators or other sources. The elastic wave signal from the vibrators passes through the earth and is detected by the plurality of geophones 226.

These geophone signals after amplification, are added to an amplitude-controlled shifting function, and the sum signal then goes to an axis-crossing-coder (AXC), and to a parallel-to-serial converter. The AXC is commanded by the array controller at selected intervals which occur just prior to the digitizing interval, to sample and code each of the sum signals. This it does by providing a high gain amplification and clipping, so that the output will be square wave, of short time duration, of positive or negative polarity dependent upon which side of the zero crossing it occurs. This is called a zero-crossing-coding process. The resulting pulses are stored in a parallel-to-serial converter means inside each of the array terminals. The details of these steps is fully described in the copending application: DATA ACQUISITION, TRANSPORT AND STORAGE SYSTEM Ser. No. 358,097. Reference is made to this application.

At the times corresponding to the digitizing intervals, these stored bits are read out in series, in each array terminal and impressed on the cables 228 to the next in series terminal. Here they are buffered and retransmitted. Thus at each digitizing interval there are NM bits serially transmitted along the cable 230 and placed on the disc in preselected address locations.

As will be described in connection with FIG. 3, there are placed on the disc, in spaced relationship, a pattern of bits, at each digitizing interval, comprising a total of NM single-bit words. This is repeated at each digitizing interval until a complete record is recorded. Next a repetition source or sweep signal is initiated by the vibrator trucks, by a radio signal, and the same procedure of recording the geophone signals is carried out. This provides a second complete set of bits representing a second record of NM channels. The next operation is to read out the bits from the first record in the first series of addresses, and to store the bits from the second record in the same first series of addresses. The bits from the first record are placed back on the disc in a second series of address, leaving the second record intact in the first series of addresses.

If it is found in the course of recording the second record that there has been some failure or difficulty, or that the data recorded are inadequate, inferior or unsatisfactory, decision can be made to eliminate that particular record. That is the reason for saving the latest record on the disc. It is not composited into the preceding data until an additional record has been recorded on the disc. By this means a plurality of record repetitions corresponding to eight bits can be composited, and stored as eight bit words on the disc, in the second series of addresses, with a total of 256 channels, digitized at 4 millisecond intervals.

These summed records are stored on the disc in a cross trace (or multiplexed) sequence at each digitizing interval. After the first disc is loaded, the second disc is connected to the speed control, and the incoming signals are transferred to and recorded on the second disc, while the data stored on the first disc is unloaded. The data on the first disc are read off the disc in a different pattern of reading, which demultiplexes the data, and converts it to trace sequence data, and sends it to the computer memory. Each of the 256 traces now are in timed sequence. They are eight bit words and are ready for processing such as, for example, being passed to the Fast Fourier Transform box, where they can be filtered or any other similar operation carried out.

While we speak of specific numbers of array terminals, channels, repeated sweeps, digitizing intervals, etc. these are only by way of example, and this invention is adapted for use in any desired configuration.

Figure 3:
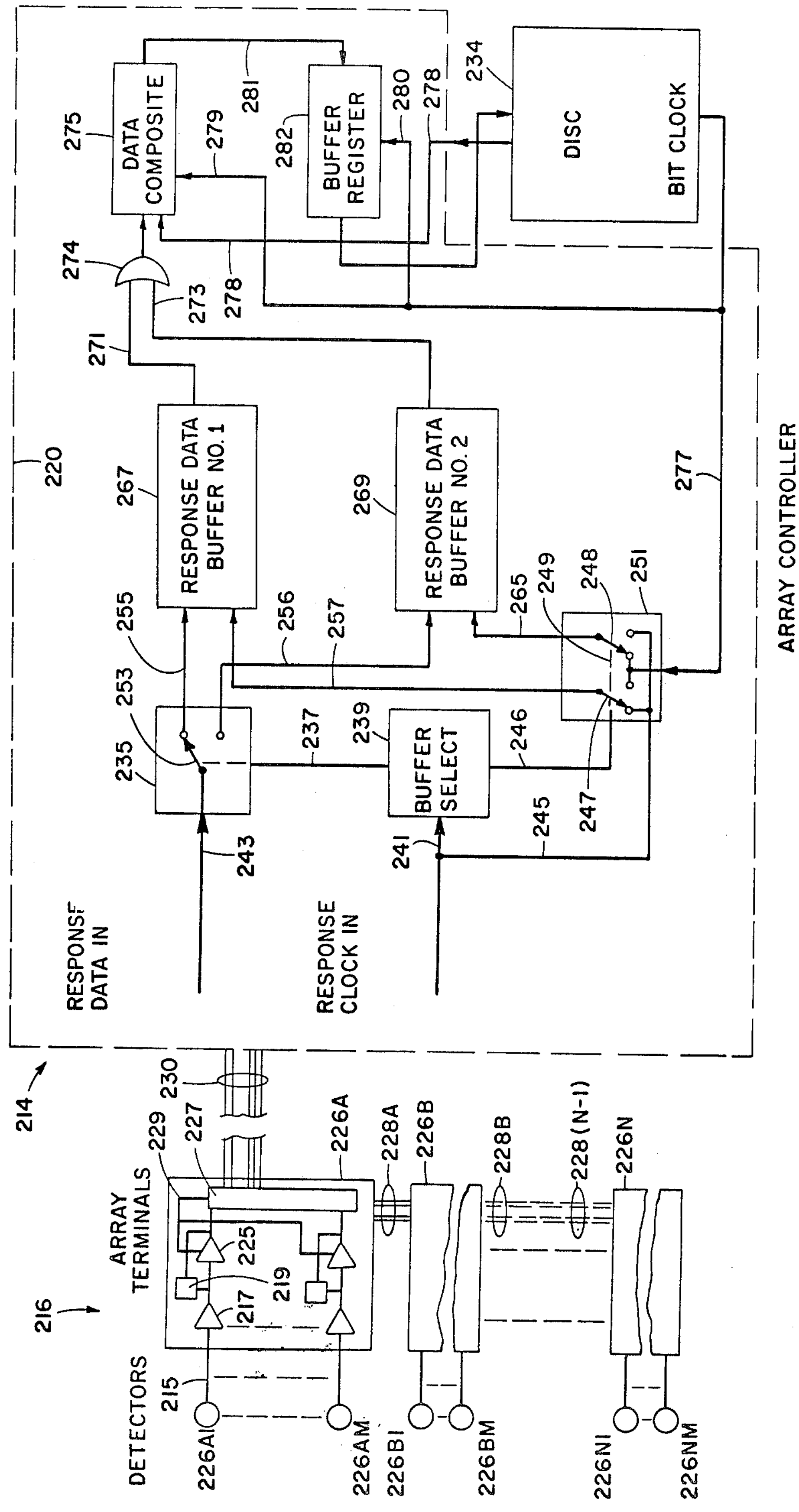
FIG. 3 is a schematic diagram of the data network in the array controller.

Referring now to FIG. 3, there is shown in the dashed outline generally indicated by the numeral 214, the data handling portion of the array controller. The array terminal group of apparatus indicated generally by the numeral 216 is substantially the same as that shown in FIG. 1 and the data and control go by way of cable 230 between the array terminals and the array controller.

In the array controller 226A, there is shown, for example, signal processing apparatus which can be used in this compositing system. It includes a geophone 226A1 connected to a fixed gain amplifier 217. A shifting function generator 219 provides an amplitude controlled shifting function which is added to the amplified geophone signal, and is coded by the axis-crossing-coder 225, and stored in parallel-to-serial converter 227.

In the cable 230 there is a signal conductor pair, one wire of which is indicated by the lead 243 as Response Data IN, and there is a pair of conductors carrying the clock signal from the last array terminal, one wire of which is 241 and is labeled Response Clock IN. In two copending companion applications, entitled "Data Acquisition Transport And Storage SYSTEM" Ser. No. 358,077; and "Data Array Network System" Ser. No. 358,097, there is fully described the manner in which data are read out from the parallel-to-serial converter and buffered in each of the array terminals. These data are read out in accordance with a clock frequency generated within each of the array terminals. This clock frequency of the last terminal 226A is transmitted in the cable 230 to the array controller so that when the data arriving on line 243 go to Response Data Buffer No. 1, for example, the rate at which the bits are read into the buffer is determined by the same clock that determines at what rate the bits are read out from the buffer in the last array terminal.

Within the dashed line 220 there is an input lead 243 for data which goes through a switch device 235 which selects which of the response data buffers, No. 1 or No. 2, is to be used to record a particular set of bits coming from the last array terminal. There are enough buffer locations in each of the two buffers 267 and 269 so that one complete set of NM bits, corresponding to the number of geophone channels, can be accommodated in each of the buffers. The switching device 235 shows by means of switch contact 253 that the incoming line 243 feeds by way of line 255 to the response data buffer 267. At the same time, buffer 267, into which the incoming data are being recorded is supplied with a clock signal by line 257 which goes by way of switch 247 to line 245 to the line 241 which is the incoming clock signal line from the last array terminal. The clock signal coming into the buffer select means 239 controls the switches 253, 247, and 243 so that on alternate digitizing intervals the incoming data goes to first one buffer and then to the other.

While buffer 267 is being loaded from incoming line 243, responsive to the disc clock on lead 257, the data are being read out of the second buffer 269, which goes by the wqy of lead 273 to the OR gate 274 to a data composite converter 275. Consider for a moment the disc 234 down in the lower right hand corner of FIG. 3. As part of the rotation of the disc there are a group of heads one of which records a pulse once each revolution of the disc, and one of which records a clock pulse corresponding to each of the bit storage locations on each of the tracks. This is called the disc clock, or bit clock, and this bit clock signal goes by way of line 277 through switch 248 and line 265 to the response data buffer 269. Thus the rate at which data are read out of the buffer 269 is exactly the same rate at which bit position locations pass under the write heads on the disc 234.

Figure 4:
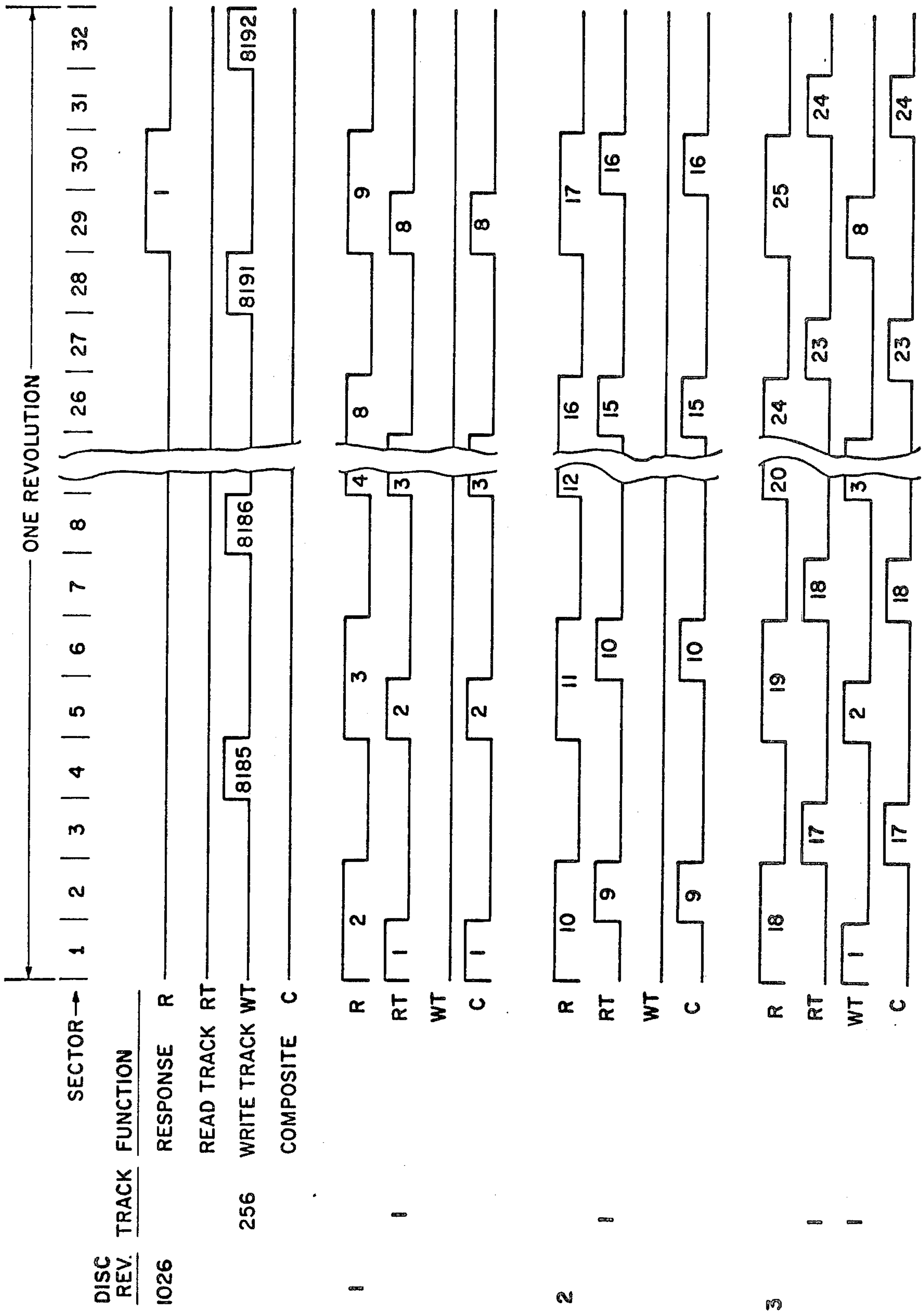
FIG. 4 represents the data storage arrangement on the disc in time and space.

As will be shown in connection with FIG. 4, as the disc 234 rotates, data are read out of both sets of storage locations by means of lead 278 and go to the data composite register 275. Here they are summed and the sum passed by lead 281 to buffer register 282. The first storage locations are single bit locations. The second storage locations are eight bit locations. The nine bits are read out, and the one bit word is added to the eight bit word. An eight bit word results.

Synchronous with the arrival of the nine bits from line 278, the single bit train stored in buffer 269, is read out at the same bit clock rate, to the data composite register 275. These single bits do not participate in the summing, but go with the eight bit sum words to the buffer 282 as nine bit words. There they are held until the disc is ready, and then they are read out as two separate trains, a single bit train, which goes into the first storage and an eight bit train representing the composited record, which goes into the second storage.

In this way, the incoming eighth sample train (for example), is stored in buffer 267, while the seventh sample train is read out of buffer 269 and merged, in the data composite 275, with the eight bit sum words, and the new trains of one bit words (the seventh sample train) and the eight bit words (the sum of the first six sample trains) go to buffer 282 and then to the disc to be stored.

The reason for the buffer register 282 is that because of the limitations of magnetic data technology, it is impossible to read out data and write data on the disc at the same time. Thus data read out from a given location on the disc and stored in the buffer register 282 for two revolutions of the disc, as will be explained in connection with FIG. 4, are then rerecorded on the disc 234 in the precisely same location from which they were withdrawn. Actually the same data are not reintroduced, but the data corresponding to the same channel are recorded in the same location.

Reviewing again the operation of this data handling equipment the control timing for the data coming into buffer 267 is the clock coming in with the data on line 241. The data being read out of the buffer 269 are read out at the rate of the bit clock from the disc 234, which not only controls the buffer 269 but the data composite register 275 and the buffer register 282 and of course the bit clock is synchronous with the rotation of the disc and therefore synchronous with the appearance of successive data storage locations on the disc. In order to do compositing, data added from previous sweeps, and the last previous new data are read off the discs two sets of locations, added in the data composite register 275 and passed to the buffer register where they remain for two revolutions of the disc. In synchronism with the disc rotation, as shown by the bit clock, the data are read out of buffer register 282 onto the disc in the same storage locations. The newest new data from buffer 269 go through the data composite 275, through the buffer 282, to the disc.

Referring now to FIG. 4, there is shown in schematic form the sequential arrangement of storage spaces on the various tracks of the disc. The disc makes one revolution in 32 ms., and there are 32 sectors on each disc, each sector of such length that they pass the head 1 ms. apart. The sector numbers in the top row can represent time of passage under the head, and/or actual storage locations on the tracks.

It is well to keep in mind that there are M channels per array terminal, and N terminals, making a total of MN channels. Typically this could be $16 \times 16 = 256$, or $64 \times 4$, for example. Also there are a possible 8192 digitizing intervals. Thus there are a possible 256 × 8192 or over two million bits per single record. These will be stored in the "first" storage locations. Also, as successive sweeps are carried out, space is provided for over two million eight bit words in the composited record. This will permit up to 127 repetitive sweeps to be composited.

While there are essentially two separate storages, one for the single bit words of the last sweep record and the other for the eight bit words of the composited records, these two storages are associated in the form of a single nine bit storge. However, these are really separate words, since they follow different procedures in the recording and compositing operations.

In FIG. 4 the four traces labeled: Response — R, Read Track — RT, Write Track — WT, and Composite — C, represent four different operations on each of the tracks represented as 256, 1, etc. This diagram is drawn on the basis of a 4 ms. digitizing interval.

On disc revolution 1026, at the time sector 29 reaches the head, the response command is generated, and the array controller sends out the command to sample and to read out.

Four ms. later when sector 1 of track 1 reaches its head, the data in sector 1, which are the data for the first digitizing interval, are read off the disc, go to data composite 275 and to the buffer register 282. Four ms. later when sector 5 of track 1 reaches the head, the data of the second digitizing interval are read off and sent to 275 and 282. This goes on for two revolutions, or the passage of 16, 4 ms. digitizing intervals. All 16 trains of bits are stored in buffer 282.

On the third revolution of the disc, the data stored in the buffer are rerecorded (as shown by the write track on track 1) in appropriate storage locations 1, 2, 3 . . . . This process in continued, with the one and eight bit words read off the disc going to the data composite 275, being added as an 8 bit word, and being merged with the single bit of new data, and passing as a nine bit word to the buffer storage 282, and after two revolutions of the disc, being recorded on the disc in the same storage locations from which the previous nine bits were read out.

While the invention has been described with a certain degree of particularity it is manifest that many changes may be made in the details of construction and arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In a data recording system having a repetitive source, in which on each repetition of said source one or more analog signals are detected, amplified and converted to digital signals which are stored, and said stored pulses are read out at selected command intervals to form trains of single bit signals, and said trains are transmitted to a data recording means, the method of recording and compositing said trains of single bit signals comprising the steps of:

a. running a rotating magnetic digital recording means at substantially constant speed, said recording means having a plurality of tracks each with a separate transducing head;

b. responsive to a first command producing said first train of single bit signals representative of a first source;

c. recording in sequence, along said tracks, in a first plurality of single bit, spaced, locations, each of the bits in said first train;

d. repeating said source for a second time and responsive to a first command producing and transmitting to said recording means a second train of single bit signals representative of a second source;

e. reading out from said recording means said first train of bits stored in said first single bit locations;

f. storing said second train of single bit signals in said first plurality of spaced single bit locations; and g. storing said first train of bits in a second plurality of spaced multiple bit word locations.

2. The method as in claim 1 including the additional steps of:

h. repeating said source for a third time and responsive to a first command, producing and transmitting to said recording means a third train of single bit signals representative of a third source;

i. reading out from said first locations on said recording means said stored second train of bits and from said second locations said first train of bits;

j. adding said second train of bits and said first train of bits to form a first train of sum words;

k. recording said first train of sum words in said second plurality of multiple-bit word locations; and l. storing said third train of single bit signals in said first plurality of spaced single-bit positions.

3. The method as in claim 1 in which said system is a seismic geophysical system and in which said analog signals are geophone signals.

4. The method as in claim 1 in which said magnetic digital recording means comprises disc means.

5. A signal detecting, coding and multiplexing system, comprising:

a. a plurality of detectors generating analog signals representative of physical parameters, and means to amplify said analog signals;

b. rotating magnetic digital recording means having a plurality of tracks, with transducing heads mounted operatively on each track;

c. means to generate first commands at first time intervals and means responsive to said first commands to convert said analog signals to single bit digital signals, and means to store said digital signals;

d. means to generate second commands at second time intervals and means responsive to said second commands to read out said stored digital signals in the form of a first train of sequential single bit pulses, on a transmitting means; and e. mean to store said first train of sequential single bit pulses on said recording means in first selected spaced positions on said plurality of tracks.

6. The system as in claim 5 including:

a. means to produce a second train of sequential bit pulses representing new data;

b. means to read out from said first selected spaced positions on said plurality of tracks said first train of sequential bit pulses;

c. means to record in said first selected spaced positions on said plurality of tracks said second train of sequential bit pulses; and d. means to record in second selected spaced positions on said plurality of tracks said first train of sequential bit pulses.

7. The system as in claim 6 including:

a. means to produce a third train of sequential bit pulses representing new data;
b. means to read out from said first selected spaced positions on said plurality of tracks said second train of sequential bit pulses;
c. means to read out from said second selected spaced positions on said plurality of tracks said first train of sequential bit pulses;
d. means to add said second train of sequential bit pulses and said first train of sequential bit pulses to form a train of first sum multiple-bit words;
e. means to record in said first selected spaced positions on said plurality of tracks said third train of sequential bit pulses; and
f. means to record said train of first sum multiple-bit words in said second selected spaced positions on said plurality of tracks.

8. In a system for compositing a plurality of sequential single bit signals on a rotating magnetic recording means, having a plurality of tracks each with its own read/write head, said tracks having a first plurality of spaced single-bit recording locations for the storage of new data in the form of a train of single bit pulses, and a second plurality of spaced multiple-bit recording locations, for the storage of old data in the form of a composited plurality of single bit trains; the method of compositing comprising the steps of:

a. reading out of said first recording locations the last previous single bit train and passing same to an adder means;
b. reading out of said second recording locations the composited old data, and passing said old data to said adder means;
c. adding said previous single bit train and said composited old data to form a sum signal and passing the sum signal into a buffer storage;
d. reading out said sum signal from said buffer storage and recording same on said recording means in said second recording locations; and
e. recording the next train of new data into said first recording locations.

9. A signal detecting, coding and multiplexing system comprising:

a. at least two spaced apart array terminals and means for collecting at least one analog signal into each of said terminals;
b. first conductor means to connect each of said array terminals in series connection to a data recording station, means in said data recording station for generating first and second command signals, and second conductor means to transmit said command signals to each of said array terminals in series;
c. first means in each of said array terminals responsive to said first commands for converting said analog signals to digital signals and for storing same in register means in said terminals;
d. second means in each of said terminals responsive to said second commands for reading out said stored digital signals in the form of a first train of digital signal; and transmitting said train of digital signals to buffer storage means in said recording station.

10. The system as in claim 9 including, in said data recording station, rotating magnetic digital recording means, having multiple tracks, and means to readout said digital signals from said buffer storage means and to record same in spaced apart recording locations on said recording means.

11. The system as in claim 10 including:

a. means responsive to a first command to produce a second train of digital signals, and responsive to a second command to transmit said digital signals in the form of a second train of digital signals to said buffer means in said data recording station;
b. means for reading out said first train of digital signals recorded in said spaced apart recording locations;
c. means for adding said second train of digital signals stored in said buffer storage means to said first train of digital signals read out from said storage locations on said rotating magnetic recording means to form a first sum signal; and
d. means for recording said first sum signal in said spaced apart recording locations on said rotating magnetic recording means.

12. The system as in claim 9 in which said first train of digital signals comprise single bit digital signals.

13. The system as in claim 10 in which said first train of digital signals comprise single bit digital signals, and said train of single bit digital signals are stored in spaced apart single bit recording locations.

14. The system as in claim 11 in which said first sum signals comprise multiple bit digital signals and said means for storing said first sum signals comprise spaced apart multiple bit recording locations.

15. The system as in claim 11 in which said rotating magnetic recording means includes first spaced storage locations for single bit digital signals, and second spaced storage locations for multiple bit digital signals.

16. The system as in claim 15 in which said rotating magnetic recording means comprises disc means.

* * * * *